United States Patent
Villanueva-Barreiro et al.

(10) Patent No.: US 12,290,750 B2
(45) Date of Patent: May 6, 2025

(54) VIDEO RECORDING SYSTEM AND METHOD

(71) Applicant: Sony Interactive Entertainment Inc., Tokyo (JP)

(72) Inventors: Marina Villanueva-Barreiro, London (GB); Nicholas Anthony Edward Ryan, London (GB); Mark Anthony, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 220 days.

(21) Appl. No.: 18/145,935

(22) Filed: Dec. 23, 2022

(65) Prior Publication Data
US 2023/0211234 A1 Jul. 6, 2023

(30) Foreign Application Priority Data
Jan. 6, 2022 (GB) .................................... 2200097

(51) Int. Cl.
*A63F 13/497* (2014.01)
*A63F 13/355* (2014.01)
*A63F 13/63* (2014.01)

(52) U.S. Cl.
CPC .......... *A63F 13/497* (2014.09); *A63F 13/355* (2014.09); *A63F 13/63* (2014.09)

(58) Field of Classification Search
CPC ....... A63F 13/497; A63F 13/355; A63F 13/63
See application file for complete search history.

(56) References Cited

U.S. PATENT DOCUMENTS

| | | | | |
|---|---|---|---|---|
| 11,158,346 B2* | 10/2021 | Sundareson | ............ | G11B 27/34 |
| 2021/0046388 A1* | 2/2021 | Schwarz | ............ | H04N 21/8549 |
| 2021/0394060 A1 | 12/2021 | Yilmazcoban | | |
| 2022/0108727 A1* | 4/2022 | van Welzen | ......... | G11B 27/036 |
| 2022/0118363 A1* | 4/2022 | Yerva | ................. | H04N 21/4781 |
| 2023/0356081 A1* | 11/2023 | Benedetto | ............... | A63F 13/46 |

FOREIGN PATENT DOCUMENTS

| | | |
|---|---|---|
| GB | 2579603 A | 7/2020 |
| JP | 2021129837 A | 9/2021 |

OTHER PUBLICATIONS

Combined Search and Examination Report for corresponding GB Application No. GB 2200097.0, 7 pages, dated Jul. 6, 2022.

* cited by examiner

*Primary Examiner* — Reginald A Renwick
(74) *Attorney, Agent, or Firm* — Kilpatrick Townsend & Stockton LLP (57) ABSTRACT

A method of video editing includes: receiving data identifying a videogame, and data representative of one or more in-game events, analysing one or more aspects of the in-game events to generate at least a first statistical model for identifying statistically significant in-game events, identifying whether a current in-game event is statistically significant based on a generated statistical model and if so, extracting video of the event from a video buffer, and evaluating whether to include the extracted video in a themed highlight reel and if so, including the extracted video in the themed highlight reel.

14 Claims, 2 Drawing Sheets

VIDEO RECORDING SYSTEM AND METHOD

BACKGROUND OF THE INVENTION

Field of the Invention

The present invention relates to a video recording system and method.

Description of the Prior Art

Video recordings of in-game footage are popular, and are often used either to provide so-called walk-throughs or guides to game play, or to enable a user to complete an in-game story when they themselves have difficulty completing it, or to enjoy good examples of play, such as by professional e-sports players or other celebrities.

However, accessing the desired particular clip or clips can be difficult, particularly when a typical game may represent 20 to 100 hours of content.

The present invention seeks to address or mitigate this issue.

SUMMARY OF THE INVENTION

Various aspects and features of the present invention are defined in the appended claims and within the text of the accompanying description.

In a first aspect, a method of video editing is provided in accordance with claim 1.

In another aspect, a computer system is provided in accordance with claim 11.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A video recording system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Typically, videogame footage is recorded by an entertainment system, which is typically a computer or videogame console that is running the videogame, or similarly a mobile phone or tablet. Instead of running the videogame, alternatively the entertainment system may receive a stream of the game from a cloud streaming service. In this case for the purposes of recording footage the entertainment system can comprise one or both of the cloud server and the client device.

Figure 1:
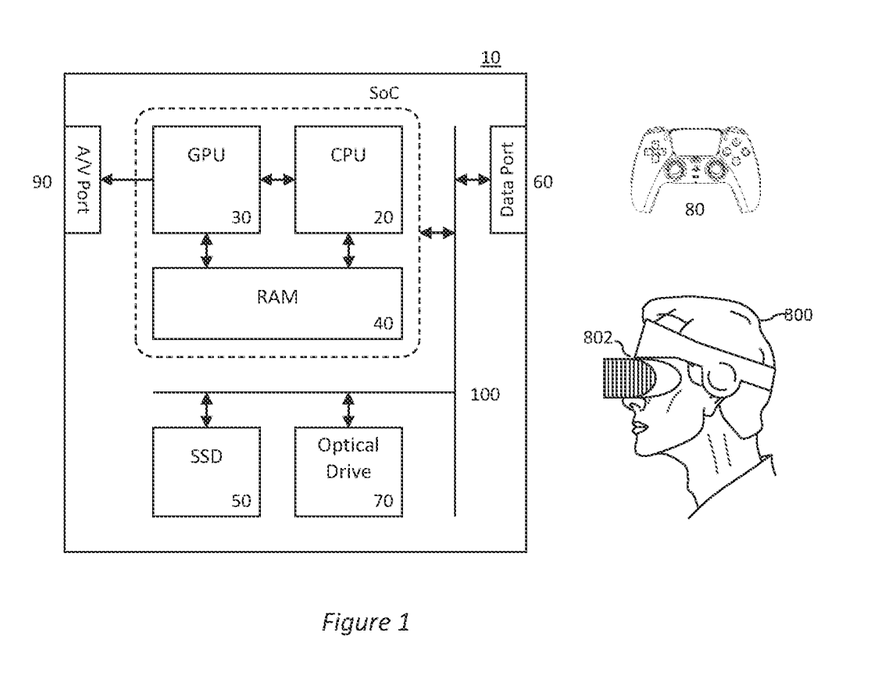
FIG. 1 is a schematic diagram of and entertainment system in accordance with embodiments of the present description.

Referring now to the drawings, wherein like reference numerals designate identical or corresponding parts throughout the several views, FIG. 1 shows as an example of an entertainment system 10, a computer or console such as the Sony® PlayStation 5 ® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

Figure 2:
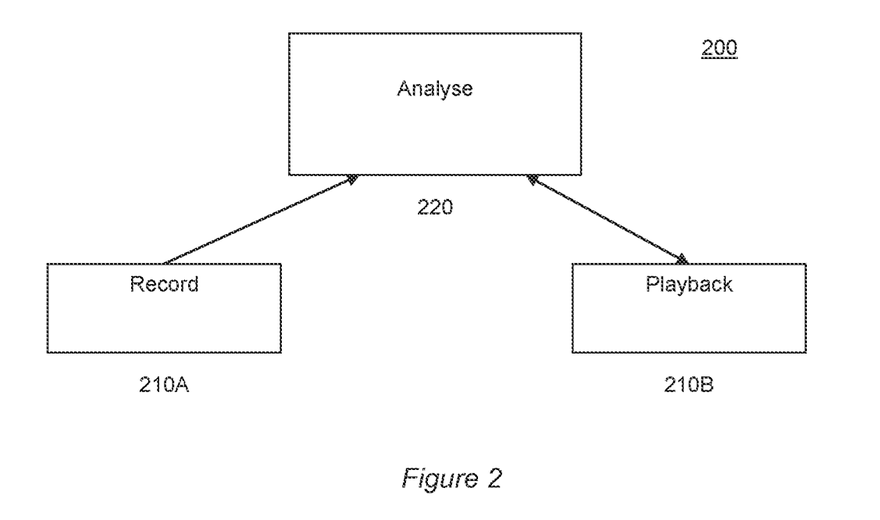
FIG. 2 is a schematic diagram of a computer system configured as a video recording system in accordance with embodiments of the present description.

Referring now also to FIG. 2, the above described entertainment system 10 may operate, under suitable software instruction, as a video recording apparatus (210A) and/or a video playback apparatus (210B). The entertainment system may also operate as an event analyser 220, either separately from the recording/playback roles or integrated with the recording role. In other implementations, the event analyser may be a remote server (such as a streaming server as described elsewhere herein), and/or the video playback apparatus may be a different form of device to the entertainment system 10, such as a (different) mobile phone or tablet, a PC, smart TV, set-top box or different variety of videogame console.

Where the apparatuses are separate devices, they may communicate via the internet (for example using Ethernet® or Wifi® ports 32, 34 as appropriate, or using cellular mobile data).

Typically, video images displayed to the user are also recorded on a circular buffer, for example recording the last 15 minutes of gameplay (or less or more, depending on the storage available to the entertainment system). When the entertainment system is a PC, console, mobile phone or the like generating the images, then the circular buffer is typically local to that device. Meanwhile when the images are generated at a streaming server, then the circular buffer may be located either at the server or at the device acting as the client.

A highlight selection system may then extract segments of such a recording for separate storage, in order to compile a highlight reel.

Segments may be extracted manually by a user for example using a beginning and end marker either during gameplay or when reviewing the content of the circular buffer in a suitable user interface. However, this can serve to interrupt gameplay typically at a moment that is most enjoyable to the user (hence their wish to memorialise it), and/or make the control interface more complex by requiring additional button bindings or menu options during gameplay.

Accordingly it is preferable to alternatively or in addition provide the capability of automatically extracting segments for compilation, and furthermore to extract segments into thematically grouped compilations—whilst a highlight reel can record highlights in the order of their occurrence, in order to create a 'best of' summary elapsed gameplay, it may be preferable to group them thematically into classes such as triumphs, bloopers, unusual moments, spectacular moments, and the like.

Such segments may be extracted from a single game play session, or from multiple sessions with the same game title, or across sessions from different game titles. In this latter case, a thematic grouping may extend to the genre of the game titles, their age rating, or some other unifying aspect such as for example the theme of a particular level in a game; hence for example if to otherwise thematically different games both have respective levels or areas where the user is at sea, then for that level any selected highlights may be thematically grouped for this reason.

To identify a highlight for extraction from the circular buffer, a statistically significant in-game event is identified.

The choice of what in game events should be recorded may include choices set by the game designer and may include one or more of crashes, character deaths, overtaking or beating an opponent or indeed being overtaken or beaten by an opponent, changing the in-game state of the user, player choices and/or player inputs, emote and celebratory actions, and the like.

However, not necessarily every one of these is desirable for a highlight reel, and so their statistical significance or notability may be assessed; for example a character death in which the gradient of the characters value exceeds a threshold may be indicative of a notable death (as they took a lot of damage very quickly). Similarly a crash in which the gradient of the speed value exceeds a threshold may be indicative of a notable death, as may a fall that exceeds a threshold distance, and so on.

Typically the threshold in such assessments indicates the point of statistical significance, and may be set by a game designer or as explained elsewhere herein defined in relation to overall gameplay, either of the current user (whether in the current play session only or over the course of playing a given game in multiple sessions) or of a corpus of users who play the game.

Hence more generally event analysis comprises detecting one or more of: predetermined events set by the designer or optionally the user such as deaths, triumphs, crashes or the like as mentioned previously; a subset of such events meeting a threshold statistical significance; and events meeting a statistical significance when compared to corresponding circumstances when played by a corpus of other players.

The latter instance based on a corpus of players represents the most generalised approach and so may be detailed herein for the purposes of explanation; the preceding instances of significant or merely detected predetermined events represent simplifications of this.

Figure 3:
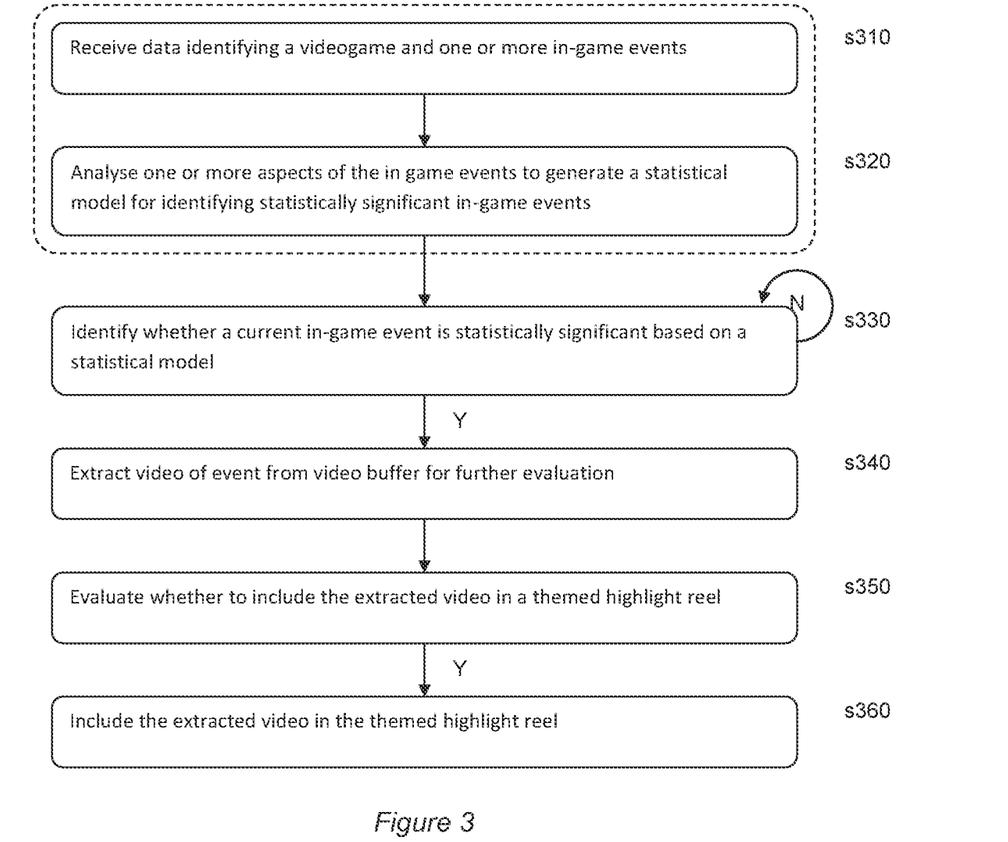
FIG. 3 is a flow diagram of a method of video recording in accordance with embodiments of the present description.

Hence turning now to FIG. 3, in a preliminary step s310 an event analyser 220 receives, from a plurality of videogame devices, data identifying a videogame (e.g. identifying the game title), and data representative of one or more associated in-game events and optionally their respective in-game positions. Hence, the event analyser receives data relating to a particular videogame that identifies in-game events, and optionally where they occur within the game, from a plurality of videogame devices.

In a second step s320 the event analyser performs analysis on one or more aspects of the in game events to generate at least a first statistical model for identifying statistically significant in-game events.

This may be done for example by performing a geospatial analysis of a plurality of events of a similar kind to identify hotspots, cold spots and other group statistics indicative of the behaviour of a corpus of players for that kind of event, or for a particular instance of an event at a particular position.

An example form of geospatial analysis may be Getis-Ord-Gi* statistic, summarised below. This analysis evaluates features with respect to their neighbours, so that clusters of similar features gain significance with respect to a global evaluation and are thus identified as hot-spots. Cold-spots may be identified in converse fashion if required.

The Getis-Ord local statistic is given.

$$G_i^* = \frac{\sum_{j=1}^{n} w_{i,j} x_j - \overline{X} \sum_{j=1}^{n} w_{i,j}}{S\sqrt{\frac{\left[n \sum_{j=1}^{n} w_{i,j}^2 - \left(\sum_{j=1}^{n} w_{i,j}\right)^2\right]}{n-1}}} \quad (1)$$

where $x_j$ is the attribute value for feature j, $w_{i,j}$ is the spatial weight between feature i and j, n is equal to the total number a features and:

$$\overline{X} = \frac{\sum_{j=1}^{n} x_j}{n} \quad (2)$$

$$S = \sqrt{\frac{\sum_{j=1}^{n} x_j^2}{n} - (\overline{X})^2} \quad (3)$$

The $G_i^*$ statistic is a z-score so no further calculations are required.

An aspect of significance for an event can be selected by weighting for it. Hence for example a set of points in game space relating to where users apply the brakes in a racing game can be weighted according to the respective eventual lap times associated with each point, or the rate of deceleration in an ensuing crash.

The analysis then generates a z-score for each point separately (e.g. which reflects how many neighbours also had high weights), and a p-value, indicating if this point is an anomaly.

It will be appreciated that this is an example analysis, and alternatively or in addition other statistical models may be used. For example, the mean and variance/standard deviation of a game variable such as health, speed or the like can be allocated for various positions or key points in a game, and if the current players particular instance of the game has a value or derivative of such a game variable that is more than the threshold standard deviation from the main, then it may be considered statistically significant. Hence for example if most racing drivers slow down at a particular hairpin bend, but the current user is travelling sufficiently fast as to be a threshold number of standard deviations outside the mean, then this may indicate a noteworthy event (typically in this case that the user about to crash). Similarly if a derivative such as a gradient for a variable is more than a threshold number of standard deviations outside a mean then this may for example indicate a sudden event such as a crash or a death, or winning a jackpot. It will be appreciated that threshold number of standard deviations may be any suitable fractional or non-integer number, as well as an integer.

These analyses can be performed for a particular game title periodically, and/or in response to receiving more data for that game (for example after receiving 1, 10, 100, 1,000, 10,000 or 100,000 additional datasets, as appropriate).

It will be appreciated that different aspects of an event or event type can be analysed separately in this fashion depending on the weighting used. For example, braking events could be analysed with respect to lap times or whether or not the lap was completed, whether a crash occurred within the predetermined period of time afterwards, vehicle types, or user demographics.

To this end, it will be appreciated that other information about game play may also be recorded by the video recording apparatus and provided to the event analyser, which may be referred to as session data; i.e. not events within the game play per se, but information about the game play, such as difficulty setting, player skill level or equipment used, final outcomes (times, scores, achievements, rankings or the like) determined after completion of a level, and so-on.

Alternatively or in addition to such geospatial analysis, a user-generated event marker or user ID may be associated with a particular uploaded set of event data.

This allows the event analyser to provide event data corresponding to specific individuals, such as for example players found on a user's friend list associated with their own user ID. In this way, alternatively or in addition to statistical analyses of a wider corpus of players, individual choices and events from a user's friendship group may form the basis for analysis. This principle could also be extended to clans, teams and other self-identified groups though user-generated markers, so that for example e-sports teams could the for statistically significant events amongst their own players, all such teams could be aggregated based on such ID, and then statistically significant events between respective teams could be identified.

More generally, such session data can enable the selection of a subset of a user corpus that matches the current player's demographic for example in terms of age, gender, and/or nationality or the like, which may help to identify statistically significant events for the user; for example if a young user is particularly precocious in their game play this is more likely to be statistically significant when compared to other young users than when compared to the wider playing population.

In any event, the statistical analysis of gameplay, using as a non-limiting example the above techniques, can determine whether for a given event a particular instance of that event is an outlier; for example if 90% of people turn right at a fork in the road then instances where people turn left are statistically significant. By contrast if the outcome is 50/50 for left and right then neither choice is statistically significant. The threshold at which an instance becomes a significant outlier may either be determined using an algorithm such as the Getis-Ord-Gi* statistic, or any suitable statistical measures such as determining the mean and standard distribution of an event-related variable or derivative thereof and identifying those instances where the variable value is a threshold number of standard distributions away from the mean as discussed previously, or may be predetermined by the game designer.

It will be appreciated that typically a user's own videogame console the like will not be arranged to receive such source data from tens, hundreds, or thousands of other users for the purposes of generating such statistical models. Hence typically these modelling steps of the event analyser are performed by a central server (optionally a streaming server as referred to previously). To illustrate this, the first steps of FIG. 3 are ring-fenced by a dotted line.

It will be appreciated that player data from a corpus of players may be obtained by such a server during beta testing or quality assurance testing of the game, to generate an initial set of statistical models either for its own use and/or for inclusion with the game at the entertainment device, and this may then be updated as players start to play the game. In this case, updated models may also be periodically downloaded or otherwise distributed to entertainment devices to improve their highlight selection.

In step s330, such a server may then go on to provide an analysis to requesting client devices (whether these are client devices in the sense of receiving streamed video games, or are running of video games themselves and clients for the purposes of requesting event analysis). Alternatively or in addition, compiled statistical models for events may be downloaded or otherwise distributed to the entertainment device so that it can analyse new events locally to determine if they are deemed statistically significant outliers suitable for extracting from the video recording loop buffer to include a highlight reel.

In any event, a given moment in the current player's instance of the game may be compared with the statistical models of the event analyser (whether in the form of a central server or a local device that has received precomputed models) to determine if an aspect of play is statistically significant. Hence in this step, the statistical model(s) are used to identify whether a current in-game event is statistically significant based on at least a first statistical model, and hence open to consideration for a highlight reel.

As noted above this may relate to choices of direction at a junction, but may relate to any aspect of gameplay such as in game equipment or capability selection, in game movement, and in game variable values such as speed, orientation, health, treasure, or the like.

Optionally as noted above such comparisons may be limited to certain predetermined events such as triumphs (defeating an enemy, completing a level, winning a race), deaths, and other events that may not be character or user driven but may impact the character, such as scripted explosions and the like, where for example the current position of the user's character may affect how they react or the damage they take.

Typically these are events detectable by certain in game event triggers, such as changes in variable values, certain code branches and script triggers and the like. Consequently for cases where the game is being streamed to a client, it is simpler for the device generating the game server to identify these predetermined events and also to perform event analysis to determine if they can be considered statistically significant.

However, in any case if an event is determined to be statistically significant, then in step s340 the highlight may be extracted from a circular buffer either in the server, or the information may be transmitted to the user's client device which, if it also maintains a circular video buffer, may extract the event for further evaluation of whether to use in a highlight reel. Extraction may be literal, involving copying the data to a separate storage area, or may be logical, setting the relevant part of the current recording to not be overwritten by the video buffer, or may be a combination of the to (for example a logical setting for further evaluations, but a literal copying when the eventual highlight reel is compiled).

Hence the above techniques describe how to identify noteworthy events within the user's game play by determining whether a given event is statistically significant.

As noted above, one approach to this is to compare a given instance of an event with corresponding events from a corpus of users or a subset thereof to determine if that instance is an outlier. An advantage of this approach is that potentially any event within the game can be evaluated in this manner and not just those anticipated as noteworthy by the developer. This may be of particular value in sandbox or open world games where events are less predicable. Alternatively or in addition, particular predetermined events and/or several classes of events such as triumphs or deaths can be chosen, or the events for consideration can be limited to these, and then instances of such events can be analysed to determine if they are an outlier.

As was noted previously herein, the above corpus-based technique is only one example.

A simpler version that is easier to implement locally on an entertainment device is to use a similar technique, but where the statistical model(s) from a corpus of players is replaced by one(s) derived from the play history of the user themselves, typically over multiple sessions with a given game or games that support consistent variables for analysis. In this case statistically significant events are thus ones where the user deviates sufficiently from their normal play in some manner, either by pulling off a significant victory, or making a catastrophic mistake.

Alternatively or in addition, rather than determining a p value or a standard deviation or other statistical assessment based on a corpus of users and/or historical user data as described previously, an equivalent threshold may be determined by the game designer.

Hence as noted previously a designer may create a statistical model by setting a threshold value for a game variable that is indicative of a statistically significant event, such as a length of fall or a reward value, and/or similarly may set a threshold value for a game variable derivative such as a gradient that is indicative of a statistically significant event, such as a rate of health loss or change of speed or rate of fire, or indeed a rate of input commands, where so-called button mashing is indicative of gameplay that is significant to the user, even if the resulting in-game outcome is not otherwise significant (for example if the player frantically tries to keep a car on the track so that there is no crash or other notable event, but clearly represents a moment of heightened tension for the player).

Again it will be appreciated that such variable values or derivatives may be similarly evaluated using any of the other techniques herein.

This enables the designer to set the severity or extremity of an event that may be stored for a highlight reel. Optionally the values may be different for different game levels, different character classes or skill levels, different difficulty settings, and/or different user demographics (for example making it easier to record a highlight reel if the user is a child by using lower thresholds), and the like. Optionally the user themselves may be enabled to alter the thresholds for example using a global setting, to increase or decrease a likelihood of highlight selections occurring.

Finally, the simplest implementation relates to detecting predetermined events selected by the developer. In this case predetermined events such as deaths, wins, defeats, and the like are detected, with optionally one key game variable relating to an event evaluated against a threshold to determine whether or not to store that instance of the event for possible use in a highlight reel.

Using any one or more of the above techniques, events (whether emergent by virtue of being statistical outliers compared to a corpus of event data, or developer predefined and/or user selected event types) are selected that may be sufficiently noteworthy to include in a highlight reel.

As noted previously herein, a summary highlight that includes such events in their order of occurrence may optionally be created, but preferably events are thematically grouped.

Example themes include triumphs, fails, bloopers, celebrations, and the like. Other themes may be possible depending upon what is detected as an event; for example a game may engage a panorama mode when the user stops playing for 60 seconds, causing the in-game camera to slowly orbit the user and capture a view of their environment. A user may wish to gather scenic views of the game in this manner as a highlight reel, and so in this case a predetermined event may be when the game engages in such a mode, and the event duration may be the time required for the camera to orbit once or twice around the user. Depending upon the implementation used, this may optionally be further filtered by a variable meeting a threshold, such as for example the draw distance during the orbit; if the draw distance is long then the scene includes distant landscape and is likely to be a deliberately chosen scenic moment, as opposed to an arbitrary moment in the middle of a forest, when the user has had to leave and answer their door. Of course, if the user did wish to select the moment within the forest, there is still optionally the scope for manually selecting a highlight event as described previously herein.

Hence in step s350, the system evaluates candidate highlights for inclusion in a themed highlight reel.

To automatically collate selected highlights into thematic groups, information associated with the highlights can be evaluated.

This associated information can include any suitable meta data that assists with grouping candidate highlights according to type. Hence it may include information relating to event location within the game, the identity of objects or characters that the user interacted with all within a predetermined radius from the game location during the event, the name of a current quest, or similar.

The information can also include indicators of user behaviour; for example if the event involved gathering resources, this may be thematically different to an event involving the use of weapons or magic, or talking with nonplayer characters.

Information can also include status indicators such as health, speed, stamina, and other indicators of changed in game circumstances either for the players own avatar or character of and/or for the characters of other players nonplayer characters that the user interacts with, has primarily centred in view, or are within a predetermined radius within the virtual environment.

Optionally, users can label candidate highlights themselves with predefined tags such as 'scary moment', 'blooper', 'high skill', and the like. In this case, if the user labels one such highlight in this manner, the system can compare other highlights for similarities and group them under this label.

Alternatively or in addition, the system can group highlights itself, and optionally do so according to assumed themes. Hence for example if the statistical significance of an event is an extreme outlier at least for some variable within the statistical model, for example above a secondary threshold for evaluating statistical significance, and the associated change to one or more variables associated with the user is positive, the highlight could be grouped in an 'epic win' reel, whereas if the associated change to one or more variables associated with the user is negative it could be grouped in a 'bloopers' reel. Such high statistical significance is likely to be indicative of an unusual event; for example a user dying during combat, even quite suddenly, is less likely to be statistically significant because lots of people die during combat and so the variance (or developer set threshold) will be large. By contrast if the user is gathering herbs and is suddenly attacked by a bear, then this is more likely to be statistically significant because the incidence of death during resource gathering are likely to be smaller and associated with a smaller health variance or developer set threshold.

Similarly if the statistical significance of the event is an outlier for example above a secondary threshold for evaluating statistical significance, and an associated change to one or more environmental variables is negative than the highlight be grouped into a scary moment reel, as this is likely to be associated with the sudden appearance of an enemy boss or environmental hazard or other dramatic change to in-game circumstance. Similarly a positive associated change to one or more environmental variables may be highlighted in a good fortune reel, as it may be associated with the appearance of friends (whether in-game friends, or real friends joining the game) or loot.

Hence more generally the system can associate a candidate highlight clip with one or more highlight reels based on information associated with the candidate highlight clip relating to one or more of the nature of the captured event, the degree of statistical significance, the nature of the statistical significance with respect to the nature of the captured event, an associated positive or negative change in user variables, and an associated positive or negative change in environmental variables. Hence in a step s360 the system can include a video of an in-game event extracted from the video buffer in a themed highlight reel, if it has been evaluated for inclusion in that themed highlight reel.

As noted above, a highlight reel may be constructed automatically based upon the evaluation of candidate highlight clips that meet similar criteria, and this may be achieved either by grouping the candidate highlight clips currently available, and/or or based on the user selecting one clip as a group exemplar, and evaluating other clips for similarity to that user selected example.

Optionally the highlight clips selected for a particular reel can be listed for a user, so that they can exclude any that have been mischaracterised; for example a sudden death on the part of the user may have been caused by a noble sacrifice to help other online friends defeat a boss, and so should not also be included in a highlight combination that includes the user accidentally driving their race car into a tree.

Such nuanced evaluations based on context may be best provided by the user, but an approximation may be achieved by listing expected and unexpected changes in user or environment variables that may be associated with certain events. For example, a battle with a large boss may be associated with triumph or death, but not with a sudden increase in wealth or some other resource—but if during the battle the user knocks over a chest full of gold, this would be an unexpected element of the event and likely statistically significant. Hence more generally the threshold significance of one or more user or environmental variables or derivatives may vary depending on the type of event in which they occur. This may be determined empirically (e.g. in a corpus of users, getting rich during a boss battle may be rare) and/or determined by the developer setting different thresholds for different event types.

Other variations may also be considered. For example, in a multiplayer game, candidate highlights from all participants, or from a team, or from players on mutual friend lists, may be considered for a given highlight reel. As noted previously, candidate highlights from multiple sessions of a game by a player may also be considered, as may candidate highlights from different game titles—for example across a game series or serialisation, or between different games the support use of the highlighting techniques herein and share a compatible event description scheme, or equally provide information to a common API provided for the purpose for example by a helper app or launch app.

As well as or instead of building a new highlight reel, candidate highlights may be added to an existing reel, or optionally may replace a clip within such a reel when some aspect of the highlight trumps and equivalent aspect of the clip—for example if a new clip has a greater statistical significance than an existing clip (for example with respect to one or more variables on whose basis inclusion with in the highlight reel is made), then the new clip may replace the existing clip, or the clip with the lowest statistical significance if the new clip is more significant than several such clips in the reel. Alternatively or in addition, when a clip has been in a reel for a predetermined period of time, its significance may be discounted (e.g. incrementally) so that it is more likely to get replaced with new clips over time.

In this way a 'best of' highlight reel for a particular theme can remain fresh and include the recent best examples of that theme.

Referring again to FIG. 3, in a summary embodiment of the present description, a method of video editing comprises the following steps, as described elsewhere herein Receiving (for example at a server from a videogame client, or within a video game machine either at a server or of a user/client) data identifying a videogame, and data representative of one or more in-game events, as described elsewhere herein; analysing one or more aspects of the in-game events to generate at least a first statistical model for identifying statistically significant in-game events, as described elsewhere herein; identifying whether a current in-game event is statistically significant based on at least a first generated statistical model, as described elsewhere herein and, if so, extracting video of the event from a video buffer (for example either logically or literally), as described elsewhere herein; and evaluating whether to include the extracted video in a themed highlight reel and, if so, including the extracted video in the themed highlight reel, as described elsewhere herein.

In an instance of the summary embodiment, the method also comprises outputting the themed highlight reel as described elsewhere herein, for example as one or more of a highlight reel video file, a highlight reel video stream, and a video signal (e.g. to a TV or head mounted display) comprising the highlight reel.

In an instance of the summary embodiment, the statistical model comprises one or more statistical measures selected from the list consisting of a Getis-Ord-Gi local statistic of an event attribute, a variance or standard deviation of an event attribute (e.g. a value or derivative thereof), and a value range for an event attribute, as described elsewhere herein.

In an instance of the summary embodiment, the step of identifying whether a current in-game event is statistically significant comprises comparing a statistical measure of an event attribute with a predetermined threshold, as described elsewhere herein; for example the threshold may be a number of standard deviations from the mean for the event attribute, or an absolute or relative number for the event attribute (typically near an end of an expected value range), or a number for a p-value or other statistical descriptor of the event attribute. The statistical significance may similarly apply to or evaluate the combination of two or more event attributes, for example from the same event or from events that occur within a predetermined period of time from each other.

In an instance of the summary embodiment, the at least a first statistical model is based upon statistical measures of one or more event attributes selected from the list consisting of player character health or a derivative thereof, player character motion or a derivative thereof player character wealth (for example in terms of a game-relevant resource abundance) or a derivative thereof, event component frequency (for example rate of button presses or weapon hits); and event component intensity (for example size of explosion or volume of sound effect), as described elsewhere herein.

In an instance of the summary embodiment, the theme of the highlight reel comprises one selected from the list consisting of triumphs (for example achievement of an in-game goal, or the acquisition of wealth or status), failures (for example dying in-game), mistakes or bloopers (for example failing in a manner that is extreme or not on an expected list of failure causes), spectacle (for example due to event intensity or outcome scale), and unusual events (similar to mistakes or bloopers, but may include, or optionally only include, events associated with a positive in-game outcome for the user, such as for example falling off a cliff and surviving), as described elsewhere herein.

In an instance of the summary embodiment, the statistical significance of an in-game event may differ according to the theme of the highlight reel, as described elsewhere herein.

In an instance of the summary embodiment, the in game events are from one or more selected from the list consisting of a plurality of players in the same multiplayer instance of a game, a plurality of game sessions played by the same player, and a plurality of game titles sharing a compatible event description scheme, as described elsewhere herein.

In an instance of the summary embodiment, the extracted video included in the themed highlight reel is periodically re-evaluated for inclusion, with the statistical significance of the in-game event depicted by the extracted video being reduced as a function of age, as described elsewhere herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Accordingly, in a summary embodiment of the present description, a computer system comprises the following, as described elsewhere herein.

A receiver (such as data port 60, or a logical receiver of CPU 20) adapted to receive data identifying a videogame, and data representative of one or more in-game events; a statistical model processor (for example CPU 20) adapted (for example by suitable software instruction) to analyse one or more aspects of the in-game events to generate at least a first statistical model for identifying statistically significant in-game events; an identification processor (for example CPU 20) adapted (for example by suitable software instruction) to identify whether a current in-game event is statistically significant based on a generated statistical model; a video extraction processor (for example CPU 20) adapted (for example by suitable software instruction) to extract video of the event from a video buffer if the current in-game event is identified as statistically significant; an evaluation processor (for example CPU 20) adapted (for example by suitable software instruction) to evaluate whether to include the extracted video in a themed highlight reel; and a highlight reel compiling processor (for example CPU 20) adapted (for example by suitable software instruction) to include the extracted video in the themed highlight reel if the extracted video is evaluated as being for inclusion in the themed highlight reel.

As described elsewhere herein the computer system may be located on one device (for example an entertainment system 10, either as part of a game streaming server or as a user's own device), or may be distributed between a server and an entertainment device.

Hence for example in an instance of the summary embodiment, a server comprises one or more selected from the list consisting of the receiver, and the statistical model processor, as described elsewhere herein, and may optionally also include one or more of the other processors listed above.

Similarly, in an instance of the summary embodiment, an entertainment device comprises one or more selected from the list consisting of the identification processor (for example making use of a statistical model received from a server, and/or once generated locally from prior user play), the video extraction processor (for example operating on a locally held video buffer), the evaluation processor, and the highlight reel compiling processor, as described elsewhere herein, and may optionally also include one or more of the other processors listed above.

It will be apparent to a person skilled in the art that variations in the above apparatus corresponding to various instances of the method as described and claimed herein are also to be considered to be within the summary embodiment, including but not limited to that:

In an instance of the summary embodiment, the system is adapted to output one or more selected from the list consisting of a highlight reel video file, a highlight reel video stream; and a video signal comprising a highlight reel, as described elsewhere herein; and In an instance of the summary embodiment, the statistical significance of an in-game event may differ according to the theme of the highlight reel, as described elsewhere herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of video editing, comprising the steps of:
receiving data identifying a videogame, and data representative of one or more in-game events;
analysing one or more aspects of the one or more in-game events to generate at least one statistical model for identifying statistically significant in-game events;
identifying whether a current in-game event is statistically significant based on a generated statistical model,
if so, extracting video of the current in-game event from a video buffer;
evaluating whether to include the extracted video in a themed highlight reel; and
if so, including the extracted video in the themed highlight reel,
wherein a statistical significance of an in-game event differs according to a theme of the themed highlight reel; or
wherein the extracted video included in the themed highlight reel is periodically re-evaluated for inclusion, with the statistical significance of the current in-game event depicted by the extracted video being reduced as a function of age.

2. The method of video editing according to claim 1, further comprising the step of outputting the themed highlight reel.

3. The method of video editing according to claim 1, wherein the at least one statistical model comprises one or more statistical measures of:
   i. a Getis-Ord-Gi local statistic of an event attribute,
   ii. a variance or standard deviation of an event attribute; and
   iii. a value range for an event attribute.

4. The method of video editing according to claim 1, wherein the step of identifying whether a current in-game event is statistically significant comprises comparing a statistical measure of an event attribute with a predetermined threshold.

5. The method of video editing according to claim 1, wherein the at least one statistical model is based upon statistical measures of one or more event attributes of:
   i. player character health or a derivative thereof;
   ii. player character motion or a derivative thereof;
   iii. player character wealth or a derivative thereof;
   iv. event component frequency; and
   v. event component intensity.

6. The method of video editing according to claim 1, wherein a theme of the themed highlight reel comprises one or more of:
   i. triumphs;
   ii. failures;
   iii. mistakes or bloopers;
   iv. spectacle; and
   v. unusual events.

7. The method of video editing according to claim 1, wherein the statistical significance of the in-game event differs according to the theme of the themed highlight reel.

8. The method of video editing according to claim 1, wherein the in-game events are one or more of:
   i. a plurality of players in the same multiplayer instance of a game;
   ii. a plurality of game sessions played by the same player; and
   iii. a plurality of game titles sharing a compatible event description scheme.

9. The method of video editing according to claim 1, wherein the extracted video included in the themed highlight reel is periodically re-evaluated for inclusion, with the statistical significance of the current in-game event depicted by the extracted video being reduced as a function of age.

10. A non-transitory, computer readable storage medium containing a computer program comprising computer executable instructions adapted to cause a computer system to perform a method of video editing, comprising the steps of:
receiving data identifying a videogame, and data representative of one or more in-game events;
analysing one or more aspects of the one or more in-game events to generate at least one statistical model for identifying statistically significant in-game events;
identifying whether a current in-game event is statistically significant based on a generated statistical model,
if so, extracting video of the current in-game event from a video buffer;
evaluating whether to include the extracted video in a themed highlight reel; and
if so, including the extracted video in the themed highlight reel
wherein a statistical significance of an in-game event differs according to a theme of the themed highlight reel; or
wherein the extracted video included in the themed highlight reel is periodically re-evaluated for inclusion, with the statistical significance of the current in-game event depicted by the extracted video being reduced as a function of age.

11. A computer system comprising:
a receiver adapted to receive data identifying a videogame, and data representative of one or more in-game events;
a statistical model processor adapted to analyse one or more aspects of the one or more in-game events to generate at least one statistical model for identifying statistically significant in-game events;
an identification processor adapted to identify whether a current in-game event is statistically significant based on a generated statistical model;
a video extraction processor adapted to extract video of the current in-game event from a video buffer if the current in-game event is identified as statistically significant;

an evaluation processor adapted to evaluate whether to include the extracted video in a themed highlight reel; and a highlight reel compiling processor adapted to include the extracted video in the themed highlight reel if the extracted video is evaluated as being for inclusion in the themed highlight reel wherein a statistical significance of an in-game event differs according to a theme of the themed highlight reel; or wherein the extracted video included in the themed highlight reel is periodically re-evaluated for inclusion, with the statistical significance of the current in-game event depicted by the extracted video being reduced as a function of age.

12. The computer system according to claim 11, wherein a server comprises one or more of:
   i. the receiver; and
   ii. the statistical model processor.

13. The computer system according to claim 11, wherein an entertainment device comprises one or more of:
   i. the identification processor;
   ii. the video extraction processor;
   iii. the evaluation processor; and
   iv. the highlight reel compiling processor.

14. The computer system according to claim 11, further comprising outputting one or more of:
   i. a highlight reel video file;
   ii. a highlight reel video stream; and
   iii. a video signal comprising a highlight reel.

* * * * *

UNITED STATES PATENT AND TRADEMARK OFFICE
CERTIFICATE OF CORRECTION

PATENT NO. : 12,290,750 B2
APPLICATION NO. : 18/145935
DATED : May 6, 2025
INVENTOR(S) : Marina Villanueva-Barreiro, Nicholas Anthony Edward Ryan and Mark Anthony Page 1 of 2

It is certified that error appears in the above-identified patent and that said Letters Patent is hereby corrected as shown below:

On the Title Page

Please delete the Title Page and insert the attached Title Page showing the corrected number of claims.

In the Claims

Column 15, Line 31-32, Insert:
--15. The computer system according to claim 11, wherein the statistical significance of the in-game event differs according to the theme of the highlight reel.--.

Signed and Sealed this
Fifteenth Day of July, 2025

Coke Morgan Stewart
*Acting Director of the United States Patent and Trademark Office*

(12) United States Patent
Villanueva-Barreiro et al.

(10) Patent No.: US 12,290,750 B2
(45) Date of Patent: May 6, 2025

(54) VIDEO RECORDING SYSTEM AND METHOD

(71) Applicant: Sony Interactive Entertainment Inc., Tokyo (JP)

(72) Inventors: Marina Villanueva-Barreiro, London (GB); Nicholas Anthony Edward Ryan, London (GB); Mark Anthony, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 220 days.

(21) Appl. No.: 18/145,935

(22) Filed: Dec. 23, 2022

(65) Prior Publication Data
US 2023/0211234 A1    Jul. 6, 2023

(30) Foreign Application Priority Data
Jan. 6, 2022 (GB) .................................. 2200097

(51) Int. Cl.
*A63F 13/497* (2014.01)
*A63F 13/355* (2014.01)
*A63F 13/63* (2014.01)

(52) U.S. Cl.
CPC .......... *A63F 13/497* (2014.09); *A63F 13/355* (2014.09); *A63F 13/63* (2014.09)

(58) Field of Classification Search
CPC ....... A63F 13/497; A63F 13/355; A63F 13/63
See application file for complete search history.

(56) References Cited

U.S. PATENT DOCUMENTS

| | | | |
|---|---|---|---|
| 11,158,346 B2* | 10/2021 | Sundareson | G11B 27/34 |
| 2021/0046388 A1* | 2/2021 | Schwarz | H04N 21/8549 |
| 2021/0394060 A1 | 12/2021 | Yilmazcoban | |
| 2022/0108727 A1* | 4/2022 | van Welzen | G11B 27/036 |
| 2022/0118363 A1* | 4/2022 | Yerva | H04N 21/4781 |
| 2023/0356081 A1* | 11/2023 | Benedetto | A63F 13/46 |

FOREIGN PATENT DOCUMENTS

| | | |
|---|---|---|
| GB | 2579603 A | 7/2020 |
| JP | 2021129837 A | 9/2021 |

OTHER PUBLICATIONS

Combined Search and Examination Report for corresponding GB Application No. GB 2200097.0, 7 pages, dated Jul. 6, 2022.

* cited by examiner

*Primary Examiner* — Reginald A Renwick
(74) *Attorney, Agent, or Firm* — Kilpatrick Townsend & Stockton LLP (57) ABSTRACT

A method of video editing includes: receiving data identifying a videogame, and data representative of one or more in-game events, analysing one or more aspects of the in-game events to generate at least a first statistical model for identifying statistically significant in-game events, identifying whether a current in-game event is statistically significant based on a generated statistical model and if so, extracting video of the event from a video buffer, and evaluating whether to include the extracted video in a themed highlight reel and if so, including the extracted video in the themed highlight reel.

15 Claims, 2 Drawing Sheets